US012783329B1

(12) United States Patent
Garg et al.

(10) Patent No.: US 12,783,329 B1
(45) Date of Patent: Nov. 3, 2026

(54) METHOD AND APPARATUS FOR DISPLAYING LANGUAGE SUGGESTIONS ON MOBILE COMPUTING DEVICES

(71) Applicant: Grammarly, Inc., San Francisco, CA (US)

(72) Inventors: Ankit Garg, San Francisco, CA (US); Anish Hegde, Sunnyvale, CA (US); Bill Chung, Vancouver (CA); Daniel Lin, San Bruno, CA (US)

(73) Assignee: Superhuman Platform Inc.

( * ) Notice: Subject to any disclaimer, the term of this patent is extended or adjusted under 35 U.S.C. 154(b) by 533 days.

(21) Appl. No.: 18/467,281

(22) Filed: Sep. 14, 2023

Related U.S. Application Data

(60) Provisional application No. 63/407,135, filed on Sep. 15, 2022.

(51) Int. Cl.
*G06F 40/253* (2020.01)
*G06F 9/54* (2006.01)
*G06F 40/166* (2020.01)
*G06F 40/232* (2020.01)

(52) U.S. Cl.
CPC ............ *G06F 9/541* (2013.01); *G06F 40/166* (2020.01); *G06F 40/232* (2020.01); *G06F 40/253* (2020.01)

(58) Field of Classification Search
CPC ...... G06F 9/541; G06F 40/253; G06F 40/166; G06F 40/232
See application file for complete search history.

(56) References Cited

U.S. PATENT DOCUMENTS

| | | | | |
|---|---|---|---|---|
| 10,505,875 B1 * | 12/2019 | Jenks | ...................... | H04L 51/48 |
| 2020/0327189 A1 * | 10/2020 | Li | ........................... | G06F 40/56 |
| 2021/0004432 A1 * | 1/2021 | Li | ......................... | G06F 40/295 |
| 2021/0397793 A1 * | 12/2021 | Li | ......................... | G06F 40/166 |
| 2023/0018027 A1 * | 1/2023 | Bhide | ..................... | G06F 21/31 |

(Continued)

OTHER PUBLICATIONS

Aveni, Timothy J., Armando Fox, and Björn Hartmann. "OmniFill: domain-agnostic form filling suggestions using multi-faceted context." arXiv preprint arXiv:2310.17826 (2023). (Year: 2023).*

(Continued)

*Primary Examiner* — Frank D Mills
(74) *Attorney, Agent, or Firm* — Van Hoven PC; Jordan Becker

(57) ABSTRACT

In one embodiment, the disclosure provides a computer-implemented method, comprising: receiving and installing an access application capable of calling a first system service; generating a graphical control element having one or more attributes which cause a mobile computing device to display the graphical control element overlaying an editable text field of a first application program; receiving a first text sequence in a first language, the first text sequence having been entered in the editable text field; transmitting the first text sequence to one or more server computing processes; determining, by the one or more server computing processes, one or more modifications to the first text sequence comprising replacement of at least one or more words of the first text sequence to result in creating and digitally storing a second text sequence in the first language; and calling a second system service using a call that includes the second text sequence.

33 Claims, 6 Drawing Sheets

(56) References Cited

U.S. PATENT DOCUMENTS

| | | | | |
|---|---|---|---|---|
| 2023/0259713 | A1* | 8/2023 | Religa | G06N 20/00 704/9 |
| 2024/0004528 | A1* | 1/2024 | Koya | G06F 9/451 |
| 2024/0152368 | A1* | 5/2024 | Groenewegen | G06F 40/166 |

OTHER PUBLICATIONS

Horacio Saggion, et al., "Making It Simplext: Implementation and Evaluation of a Text Simplification System for Spanish," ACM Transactions on Accessible Computing, May 2015, vol. 6, No. 4, Article 14, 36 pages.

Fred Karlsson, et al., "Constraint Grammar," Walter de Gruyter & Co., 1994, Berlin, Germany, 440 pages.

Denis Rothman, "Transformers for Natural Language Processing," Packt Publishing, Jan. 2021, Birmingham, UK, 385 pages.

* cited by examiner

METHOD AND APPARATUS FOR DISPLAYING LANGUAGE SUGGESTIONS ON MOBILE COMPUTING DEVICES

BENEFIT CLAIM

This application claims the benefit under 35 U.S.C. § 119 (e) of provisional patent application 63/407,135, filed Sep. 15, 2022, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Grammarly, Inc.

TECHNICAL FIELD

One technical field of the present disclosure is computer-implemented artificial intelligence, in the subfield of natural language processing, using models that are programmed to derive semantics such as intent from a source text. Another technical field is computer-implemented natural language text addition, modification, or suggestion. Another technical field is cross-platform computer-implemented or programmed systems for assisting users in the drafting of natural language text.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Natural language is a complex phenomenon that may be difficult to accurately model using digital data and machine-executable instructions. Nevertheless, since the advent of artificial intelligence (AI), computer-implemented natural language processing (NLP) systems have developed certain capabilities to derive semantic meaning from an electronic text or to analyze the syntactic correctness of the electronic text. For example, machine learning (ML)-based techniques have been developed for deriving semantics such as a classification of a document containing the text, the topics of the text, the meaning of the text or portions thereof, a sentiment of the text or portions thereof, an intent of the text or portions thereof, or other semantics. In another example, ML-based techniques have been developed for detecting incorrect, deficient, or non-optimal grammar or syntax. While these ML model outputs are theoretically useful to a drafter of a text for a variety of purposes, such as for improving the clarity or the tone of the drafted text, it remains challenging for writers to use these outputs to improve their writing for several reasons.

First, modern writers draft natural language text on mobile interfaces, across multiple application programs. In these varied settings, traditional methods of showing underlines or another markup indicative of ML model output, such as by formatting a text, may be ineffective. Moreover, formatting styles are limited, and it may be impossible to implement advanced markup such as a heatmap using formatting. Finally, adding formatting which may be a slow operation may require different processes in different applications, potentially causing difficulties in integrating formatting techniques across a wide variety of platforms, operating systems, software, or browsers.

Second, the digital landscape for drafters of natural language text is frequently fluid, involving a shifting focus: computer users may switch from one application to another. Moreover, mobile device users may scroll or change the layout of a page displaying text, or they may scroll through the text such that the text presently being displayed on a device display shifts. Throughout these numerous changes and shifts, various software elements may not push event updates or otherwise signal a changed focus or other shift that modifies the text being displayed on a device display-potentially causing a disconnect between the displayed text and ML model outputs like markup.

Spell checking, grammar checking, and other language processing have been implemented in software tools. Commonly, check functions are integrated into a word processor or other application so that the check functionality has direct access to text that is created in the application. Independent check applications also are available and often offer performance and functionality that is superior to embedded functions. However, operating systems and applications can impose programmatic security controls that prevent one application from directly accessing and changing the text that has been created or displayed using a second application. Consequently, there is no simple way for a first independent application, which implements software-based grammar checking and other language processing, to directly access and modify text elements that were created using a completely separate application, especially on selected mobile computing device operating systems such as ANDROID.

Based on the foregoing, there is an acute need in the relevant technical fields for a flexible computer-implemented high-speed cross-platform system with real-time response capable of inspecting a draft text and suggesting alternative text that improves the original or supplements the original in a manner that clarifies the text and/or improves its tone, while interoperating with a device operating system that controls access of a first application to UI widgets and/or data of a second application.

SUMMARY

The appended claims may serve as a summary of the invention.

DETAILED DESCRIPTION

Figure 1:
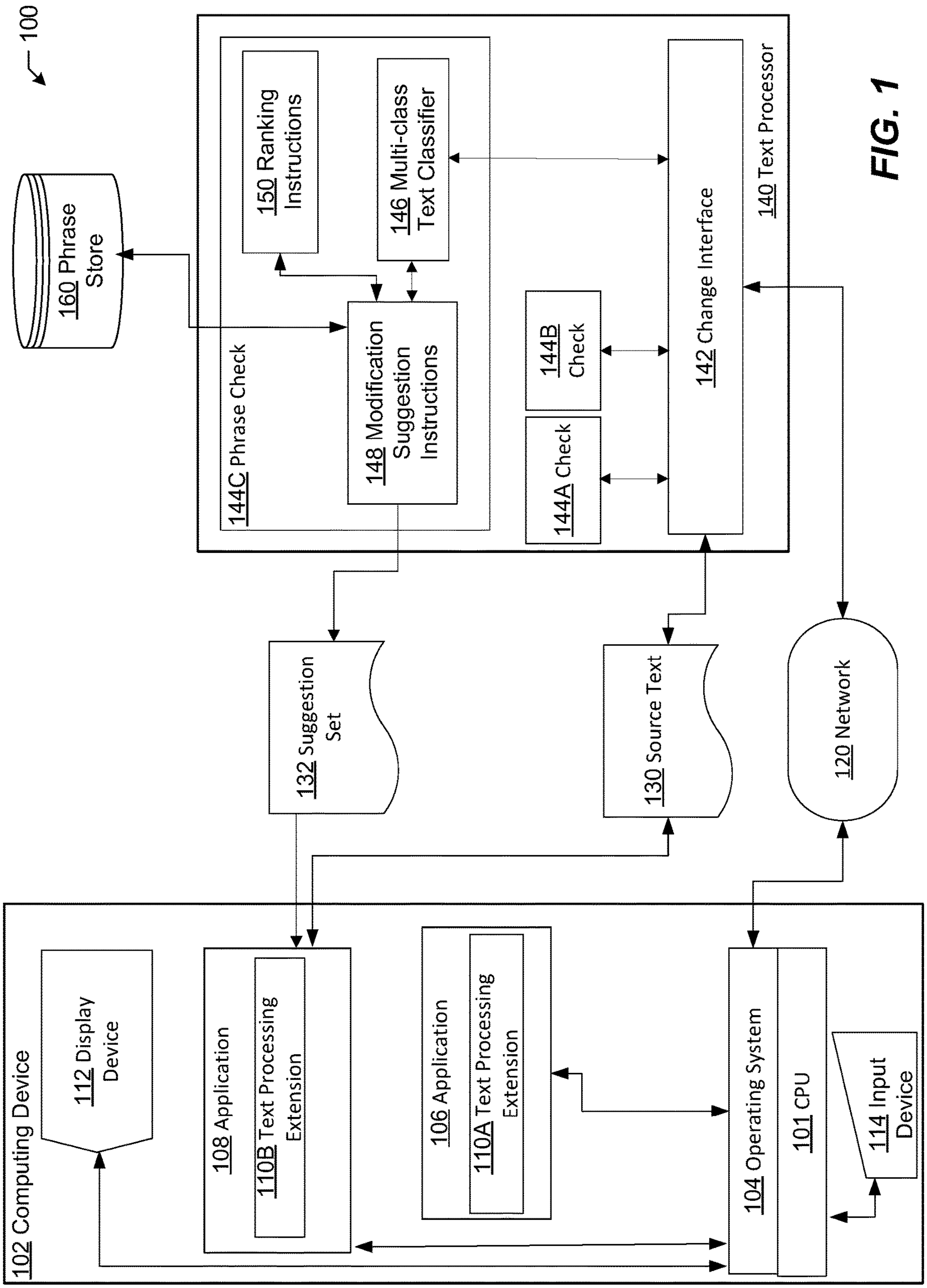
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
   2.1 Example Natural Language Text Processing-Modification Suggestions
   2.2 Graphical Output Using Transparent Windows
   2.3 Application Programming Interface Permissions
3. Implementation Example—Hardware Overview

1. General Overview

In one embodiment, a computer-implemented method comprises receiving and installing, in a mobile computing device, an access application that is capable of calling a first system service executing in a mobile computing device; generating a graphical control element having one or more attributes which when interpreted by the mobile computing device cause the mobile computing device to display the graphical control element overlaying an editable text field of the first application program; receiving, a first text sequence in a first language, the first text sequence comprising unstructured natural language text, the first text sequence having been entered in the editable text field of the first application program; transmitting the first text sequence of the application program to one or more server computing processes; determining, by the one or more server computing processes, one or more modifications to the first text sequence, the modifying comprising replacement of at least one or more words of the first text sequence to result in creating and digitally storing a second text sequence in the first language; and calling a second system service using a call that includes the second text sequence, the second system service being configured to cause displaying, by the mobile device, the graphical control element containing one or more icons corresponding to each respective modification, the one or more icons displayed via the floating element overlaying the editable text field of the first application program.

In an embodiment, the access application being programmed to call one or more accessibility functions of an operating system of the mobile computing device. The access application can be programmed to call one or more functions of a first application programming interface ("API") that is associated with the first system service.

In one embodiment, a computer-implemented process is programmed to perform calling a first application programming interface ("API") that is associated with a first system service executing in a mobile computing device; receiving, in response to the call, a first text sequence in a first language, the first text sequence comprising unstructured natural language text, the first text sequence having been entered in an editable text field of a first application program; transmitting the first text sequence of the application program to one or more server computing processes; determining, by the one or more server computing processes, one or more modifications to the first text sequence, the modifying comprising replacement of at least one or more words of the first text sequence to result in creating and digitally storing a second text sequence in the first language; and calling a second system service using a call that includes the second text sequence, the second system service being configured to cause displaying, by the mobile device, a graphical control element indicating the second text sequence.

In one embodiment, the graphical control element may be overlayed with the first application program. In one embodiment, the first API may be an Accessibility API; additionally, or alternatively, an accessibility service can be programmed and installed as an application available to other applications under control of the operating system.

In one embodiment, the mobile computing device may use an ANDROID operating system.

One embodiment comprises requesting permissions from the first API, the permissions including a request to display the graphical control element in a configuration overlaying the first application program.

One embodiment comprises, in response to receiving the permissions from the first API, determining a location within the display of the mobile device for displaying the graphical control element in the configuration overlaying the first application program and specifying the location in the calling the second system service.

In one embodiment, the graphical control element indicative of the second text sequence may include a numeric identifier. The numeric identifier may indicate a total number of modifications corresponding to the first text sequence.

In one embodiment, the second text sequence may be displayed in a transparent window in the graphical control element. As an example and not by way of limitation, the graphical control element indicative of the second text sequence may include one or more underlined portions of the first text sequence, where the underlining may indicate a suggested modification.

In one embodiment, the graphical control element indicative of the second text sequence may display, in a transparent window, one or more types of markup corresponding to one or more character ranges associated with that type of markup within the second text sequence.

In one embodiment, determining one or more modifications of the first text sequence may further comprise receiving, at a trained machine-learning model, the first text sequence in the first language; executing the trained machine-learning model on the first text sequence, thereby outputting modifications specifying one or more types of markup and one or more character ranges associated with that type of markup; programmatically transforming the output into the second text sequence, the second text sequence including the modifications specifying the one or more types of markup and associated character range associated with that type of markup.

In one embodiment, an operating system of the mobile computing device may comprise both the first system service and the second system service. As an example and not by way of limitation, the first system service may be responsive to the first API and the second system service may be responsive to a second API.

2. Structural & Functional Overview

FIG. 1 illustrates a distributed computer system 100 showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to one or more application programs or apps 106, 108, but other embodiments may have more or fewer apps or applications hosted on computing device 102.

In one embodiment, at runtime, one or more of applications 106, 108 may load, or be installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, applications, or operating system extensions. The precise means of implementing a text processing extension 110A, 110B or to obtain input text is not critical provided that, if text processing extension 110A, 110B is implemented as an extension, then said extension is compatible with and can be functionally integrated with a host application 106, 108. As explained further herein with more specificity, text processing extensions 110A, 110B may also be implemented as a standalone application instead of as an extension.

In some embodiments, a text processing extension 110A may be installed as a stand-alone access application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the access application manages. Accessibility services or accessibility APIs of the operating system 104 may be implemented or called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein. Example accessibility APIs that may be used for these purposes include UI Automation, IAccessible2, OS X Accessibility, or Accessibility. Or, each text processing extension 110A, 110B can be implemented as an access application, for example using ANDROID or other operating systems in which all OS services, primitives, and utilities are considered applications.

In one embodiment, text processing extensions 110A, 110B may execute programmed instructions formatted to cause subscribing to one or more events provided by APIs, including one or more events provided by the aforementioned accessibility APIs. In various embodiments, the programmed instructions are formatted to cause subscribing to one or more APIs provided by an operating system 104, such as a WINDOWS or a MAC OS operating system. Such APIs may be referred to as "low-level" APIs. Various events may be programmatically subscribed to, including layout change events or scroll events. Such events may be indicative of a change in focused element or of a likelihood of different text being displayed on display device 112.

In some embodiments, events required for detecting new text being displayed on display device 112 may not be received by text processing extension 110A, 110B. In such embodiments, global event hooks (such as CGEventTap) may be programmatically implemented to observe mouse or trackpad input, and content updates may be triggered based on those observations. For example, text processing extensions 110A, 110B may be programmed to observe scroll events, mouse movement events, mouse button pressed events, arrow key pressed events, or other events, and to schedule light-weight updates for such events. In an embodiment, subsequent scroll events may be ignored while the update is being processed and then may be subsequently processed in turn.

In some embodiments, each text processing extension 110A, 110B is linked, loaded with, or otherwise programmatically coupled to or with one or more of applications 106, 108 and, in this configuration, is capable of calling API calls, internal methods, or functions, or other programmatic facilities of the application. These calls or other invocations of methods or functions enable each text processing extension 110A, 110B to detect text that is entered in input fields, windows, or panels of application 106, 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that application 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch-to-text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc.

Network 120 broadly represents one or more local area networks, wide area networks, campus networks, or internetworks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private data center, public data center and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute on a first computer, and text processing extensions 110A, 110B may execute on a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processing extension 110A, 110B that is executed at the second computer and programmatically receives the digital electronic object comprising the source text via a message initiated at the text processing extension and transmitted to the text processor; and/or a text processing extension 110A, 110B executes in association with an application program that is executing at the second computer, a text processing extension 110A, 110B being programmed to automatically detect a change in a text entry window of the application program and, in response, to initiate the message; and/or the text processor executes in association with a browser that is executing at the second computer, a text processing extension 110A, 110B being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, spell checking, and translation. In an embodiment, check 144C is programmed as a phrase check, and therefore it is also denoted "phrase check 144" in this description. In an embodiment, phrase check 144 comprises a multi-class text classifier coupled to modification suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, phrase check 144C is coupled to or can access, a phrase store 160, which may be integrated with text processor 140 or implemented as separate storage. In an embodiment, phrase store 160 comprises a database, flat file system, object store, or another digital data repository that stores a large number of textual phrase suggestions, in association with category values or tags that specify a category or type of communication, text, or document in which the suggestions could be substituted. Thus, phrase check 144 and/or text processor 140 may be programmed for evaluating each particular source text unit among the plurality of source text units using a trained multi-class text classifier machine learning model and receiving a classification output from the multi-class text classifier that classifies each particular source text unit as a particular class of phrase among a plurality of possible classes of phrases.

Figure 2:
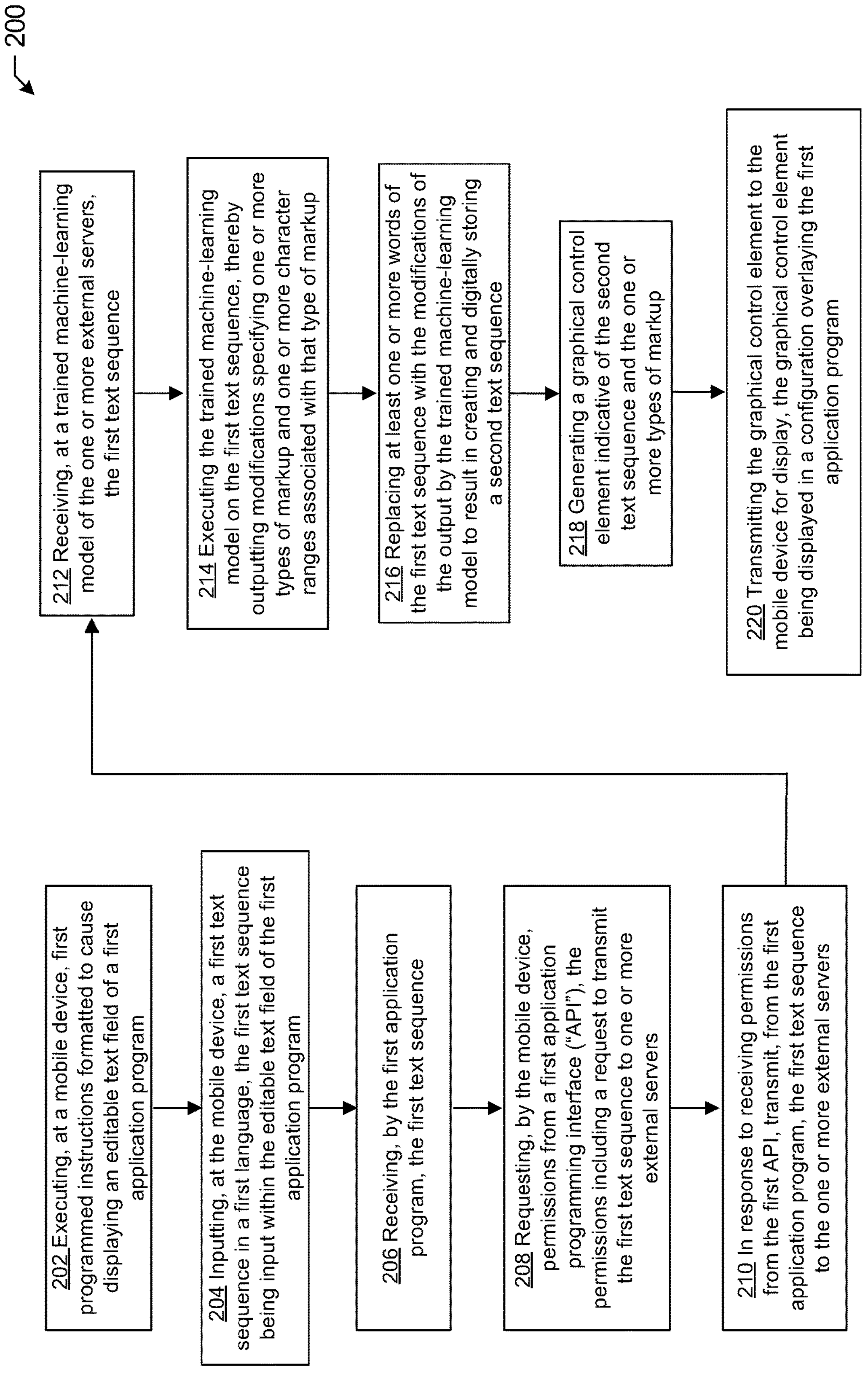
FIG. 2 illustrates a computer-implemented process of generating a graphical control element indicative of a text sequence and associated markup, in one embodiment.

As further described herein for FIG. 2, in an embodiment, modification suggestion instructions 148 are programmed, in part, to output a suggestion set 132 to transmit to text processing extension 110B.

2.1 Example Natural Language Text Processing-Modification Suggestions

In one embodiment, a computer-implemented process is programmed to detect a type or category of text sequence that is being drafted and suggest one or more modifications to phrases or sentences to substitute for the original. Suggested text phrases may be selected from a large corpus of previously manually drafted sentences and phrases. Selected text phrases may be ranked and filtered to result in suggesting a manageable set of text phrases. With this approach, adding specially chosen content to existing content can change the warmth or tone of the text while preserving its meaning. Unlike prior approaches, in an embodiment, the process may be programmed to artificially understand the intent of the original text as a basis for suggesting other content to add. Furthermore, embodiments may interoperate with a visual or graphical user interface that is programmed to enable users to see what the change to the text will be and whether they want it before they engage with the suggestion.

FIG. 2 illustrates a computer-implemented process 200 of generating a graphical control element indicative of a text sequence and associated markup, in one embodiment. FIG. 2 and each other flow diagram herein are intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

At step 202 of FIG. 2, in an embodiment, a mobile device (for example, computing device 102) may execute first programmed instructions formatted to cause displaying an editable text field of a first application program (for example, application 106). As an example and not by way of limitation, the first application program may be a social media application, an electronic messaging application, a notetaking application, and/or any other suitable application containing an editable text field.

At step 204, a first text sequence (for example, source text 130) in a first language may be input within the editable text field of the first application program of the mobile device. As an example and not by way of limitation, the first text sequence may be input within text processing extension 110A coupled to an application program. As described for FIG. 1, each text processing extension 110A, 110B may be programmed to transmit the first text sequence to text processor 140. Thus, invocation of the process of FIG. 2 occurs in response to a user drafting text in application 106.

At step 206, the first application program may receive the first text sequence. As an example and not by way of limitation, the first text sequence may be received via text processing extension 110A coupled to the first application program (for example, application 106).

At step 208, the mobile device may request permissions from a first application programming interface ("API"). As an example and not by way of limitation, the permissions may include one or more requests to transmit the first text sequence to one or more external servers. For example, the text sequence may be transmitted to one or more external servers via network 120.

At step 210, in response to receiving permissions from the first API, the mobile device (for example, computing device 102) may transmit the first text sequence from the first application program to the one or more external servers via network 120.

At step 212, in response to transmitting the first text sequence to one or more external servers, one or more trained machine-learning models of text processor 140 may receive the first text sequence and begin processing the first text sequence. In some embodiments, text processor 140 may be implemented as a back-end server programmed to receive and distribute text changes to a plurality of extensions that are programmed to execute multiple types of checks on the first text sequence (for example, source text 130).

At step 214, the one or more trained machine-learning models may be programmed to execute and evaluate the first text sequence and output modifications specifying one or more types of markup and one or more associated character ranges associated with that type of markup. As an example and not by way of limitation, the one or more trained machine-learning models of text processor 140 may transmit the first text sequence (for example, source text 120) through phrase checks 144A, 144B. In this example, phrase check 144A, 144B may be programmed to form vectors that represent sentences and the surrounding context of source text 130 (for example, the first text sequence), then search for matching vectors in a labeled dataset that is digitally stored in phrase store 160. The matching may use fuzzy similarity algorithms. In this manner, the text processor 140 may be programmed to divide the source text into one or more source text units, and one example of the source text unit is a sentence. The dividing may use a parser or other programmed algorithm capable of inspecting natural language text, identifying tokens or units of the text, identifying syntactic units, and so forth. Other units may be used in other embodiments including clauses, multi-sentence groups, paragraphs, and so forth.

Alternatively, one or more machine-learning models, structured as one or more text classifiers, may be trained on a large corpus of source sentences, and then used to evaluate a current sentence, outputting a classification of where to inject a suggestion. For example, at step 214, the one or more machine-learning models may output a modification indicating where to inject a suggestion or other modification. As an example, source text 120 may be programmatically transmitted to multi-class text classifier 146, where the multi-class text classifier 146 may implement a multi-class machine learning model capable of outputting a plurality of distinct label values, each label value representing a type or category of intent represented in the source text 130.

In an embodiment, the multi-class text classifier 146 may be programmed using the FASTTEXT model library authored by Facebook, Inc., and summarized at the time of this disclosure in the folder/tools/fasttext of the internet domain “ai.facebook.com”.

As an example and not by way of limitation, the markup in step 214 may include the replacement of one or more words within a text sequence, underlining, strikethrough, or any other suitable markup. At step 214, the process may be programmed to map the output modifications to an initial set of matching phrase suggestions, for example, in a plurality of candidate phrase suggestions that are stored in a digital database. Thus, after the detection of qualifying sentences, phrases, or clauses in source text 130, the process may determine which phrases to suggest, selected from a large plurality of candidate phrase suggestions in phrase store 160. As an example and not by way of limitation, step 214 may include generating and submitting a query to phrase store 160 to select a result set of all stored phrases having label values that match an output label value from multi-class text classifier 146. However, the result set may contain too many candidate phrases to present in a user interface of the application 106, 108 (FIG. 1). Therefore, in an embodiment, at step 210, the process is programmed to process the initial set of matching phrase suggestions using ranking instructions 150 to order the phrase suggestions and filter or reduce the phrase suggestions to a reduced-size set, comprising an output set of phrase suggestions that is fewer in number than the initial set. In some embodiments, filtering is executed first, for example, to select the first five or ten candidate phrases from the result set, and then ranking is used. Alternatively, filtering to five or ten candidate phrases can be executed without ranking.

In some embodiments, approaches other than mapping followed by filtering may be used at step 214. For example, instructions may be programmed to score the candidate phrase suggestions, for example, using an ElasticSearch information retrieval score, and to select the top N candidates, without a need for a filtering step. The value “N” may vary in different embodiments; example values are “1” to “10” or any integer within a range of “1” to “10”.

The ranking instructions 150 may be programmed to rank the initial set of phrase suggestions (for example, modifications) according to any useful ranking criterion such as similarity to a source text unit, dissimilarity, popularity across a community of users, or other criteria. In one ranking approach, step 214 may be programmed to order the result set of phrase suggestions in inverse order of similarity to the source text 130 via the one or more trained machine-learning models. Ordering in inverse order of similarity can avoid presenting, to the user, a suggestion that is too similar to the source text 130. To support this step, in an embodiment, the result set of candidate phrases obtained at step 214 can be submitted in real-time to a sentence similarity processor to receive, in return, a similarity value for each candidate phrase that reflects a degree of similarity to the source text 130. Or, ranking instructions 150 may be programmed to calculate, in real-time, a set similarity value between n-grams that are present in source text 130 and each candidate phrase of the result set; the resulting set similarity values may be programmatically provided to modification suggestion instructions 148 for presentation, in suggestion set 132, in order of lowest similarity first. The result set of candidate phrase suggestions received from phrase store 160 may comprise multiple similar variants.

In an embodiment, the effect of ranking instructions 150 when programmed as just described is to avoid placing such similar variants in suggestion set 132 so that variants are near to one another in order when presented in the application 106, 108 via the text processing modules 110A, 110B. To enhance this effect, ranking instructions 150 and/or modification suggestion instructions 148 may be programmed using a clustering approach. For example, candidate phrase suggestions of the result set may be divided into a plurality of different groups by executing a clustering algorithm on the result set to result in grouping similar phrase suggestions. Five or six clusters could be used, for example, and ranking instructions 150 and/or modification suggestion instructions 148 may be programmed to conduct ranking as previously described and then select the highest-ranked phrase from each cluster successively to form a final set of phrase suggestions for output as the suggestion set 132.

In an embodiment, source text 130 may comprise a plurality of different sentences each yielding different label values for different types or different categories when the sentences are processed using the multi-class text classifier 146. In an embodiment, modification suggestion instructions 148 are programmed to generate phrase suggestions only for a first label value that is initially output from multi-class text classifier 146 for a first sentence that is processed. Or, in an embodiment, the multi-class text classifier 146 is programmed to process all sentences that are present in source text 130, resulting in outputting a plurality of different label values; modification suggestion instructions 148 may be programmed to select one label value, using pseudo-random selection, from among all the label values and then select candidate phrase suggestions only for the selected single label value.

At step 216, the one or more trained machine-learning models may instruct text processor 140 to replace at least one or more words of the first text sequence (for example, source text 130) with the modifications of the output by the trained machine learning model. As an example and not by way of limitation, the output modifications may be transmitted to the mobile device as suggestion set 132. The resulting output may be created and digitally stored as a second text sequence. In particular embodiments, the second text sequence may be transmitted by text processor 140 to the mobile device (for example, computing device 102) for display via display device 112.

At step 218, in response to receiving the second text sequence from text processor 140, text processor 140 may generate instructions to generate a graphical control element, where the graphical control element may be indicative of the second text sequence and the one or more types of markup.

At step 220, text processor 140 may transmit the graphical control element to mobile device (for example, computing device 102) for display via display device 112. As an example and not by way of limitation, the graphical control element may present one or more displays indicative of the second text sequence and the associated one or more types of markup. In a particular embodiment, the graphical control element may be displayed in a configuration overlaying the first application program (for example, application 106).

2.2 Graphical Output Using Transparent Windows

Figure 3B:
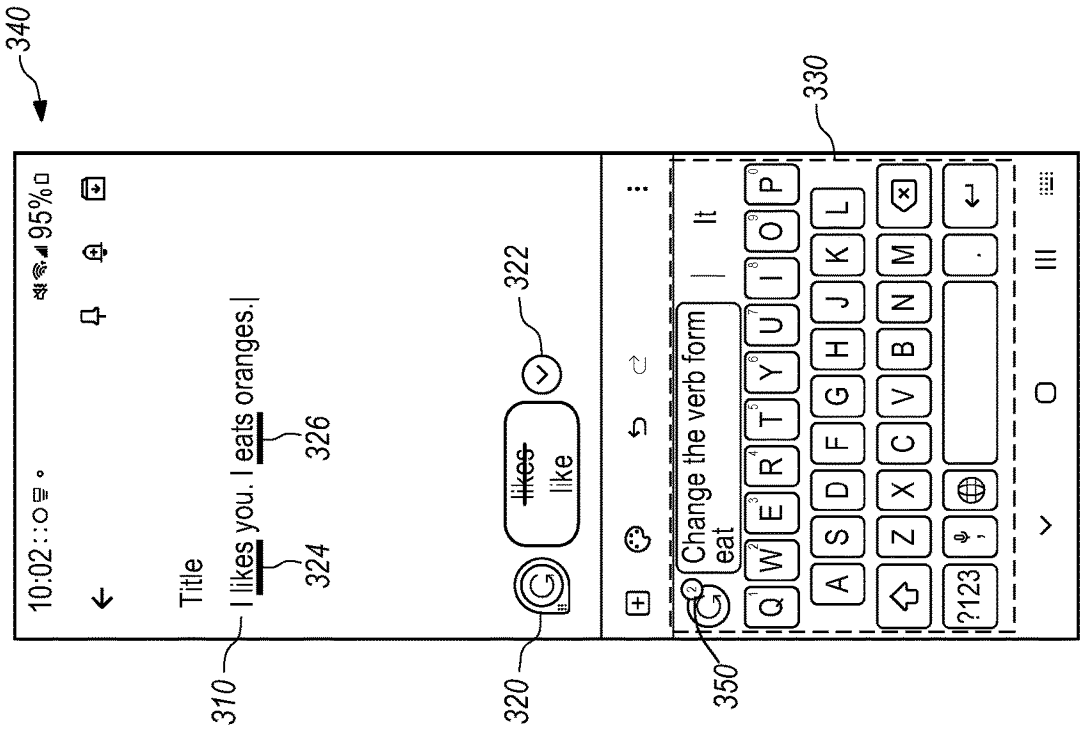
FIG. 3B illustrates an example graphical user interface that may be programmed to display a modified text sequence in conjunction with an application.
Figure 3A:
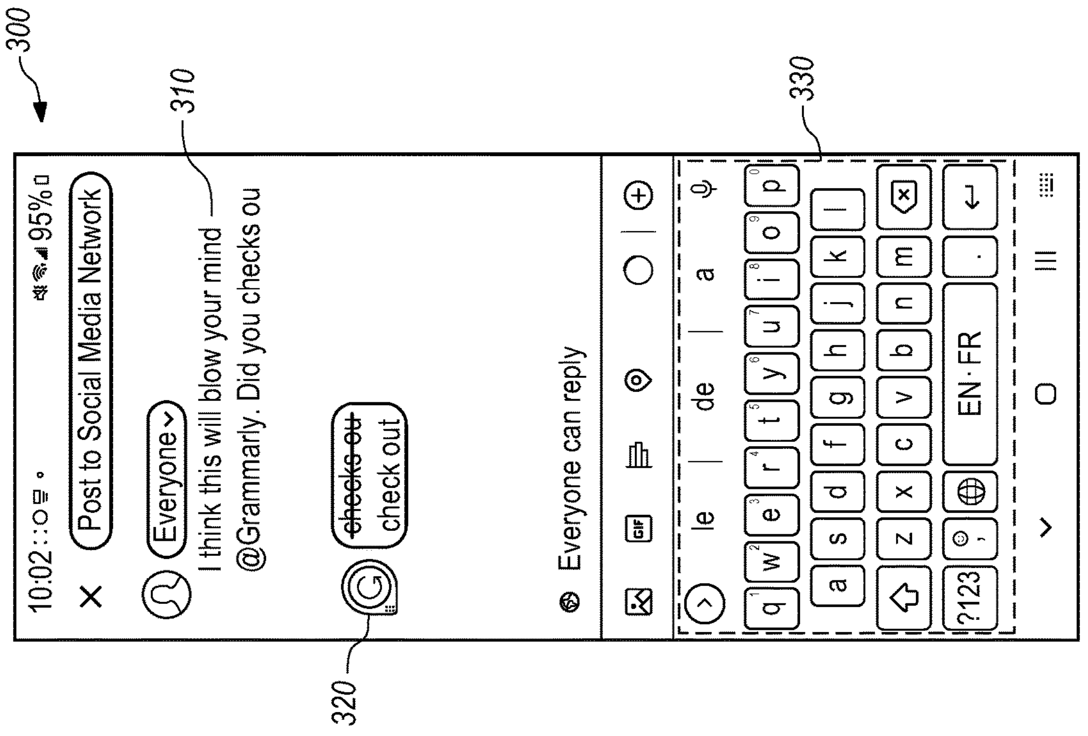
FIG. 3A illustrates an example graphical user interface that may be programmed to display a modified text sequence in conjunction with an application.

FIG. 3A illustrates an example graphical user interface 300 that may be programmed to display a modified text sequence in conjunction with an application (for example, application 106). In FIG. 3A, a graphical user interface (GUI) window 300 provides a social media composing function that includes an editable text field. In this example, the GUI window displays a portion of a social media post that is undergoing composition (for example, input text 310). In this example, input text 310 states "I think this will blow your mind @Grammarly. Did you checks out". As an example and not by way of limitation, input text 310 may be drafted by a keyboard 330 of a mobile device.

In response to receiving input text 310 within the editable text field of application 106, text processing module 110A, 110B may be programmed to transmit input text 310 to text processor 140 via network 120. In particular embodiments, text processor 140 may execute one or more trained machine-learning models on input text 130 to output one or more modifications. The output modification may include a grammar correction, phrase suggestion, or any other suitable modification. As an example and not by way of limitation, the output modification suggestion instructions 148 each correspond to the same sentiment, category, or class as each source text unit of input text 310, based on classification and mapping steps as previously described.

In an embodiment, text processing extensions 110A, 110B are programmed to cause displaying, in association with a text entry widget, box, or field of any of applications 106, 108, or other applications executing on computing device 102 under the control of operating system 104, a graphical icon that visually indicates the availability of a text modification service. For example, text processing extensions 110A, 110B are programmed to cause displaying a modification icon 320 in, on, or near a text entry widget, box or field of an application. To cause displaying the icon, the text processing extensions 110A, 110B can be programmed to call a service of operating system 104 or another application to visually render the modification icon 320 as an overlay, animated, or floating element over, in, on, or near the text entry widget, box or field of an application. In an embodiment, the icon can be created under ANDROID using a layout file that establishes a Floating Action Button (FAB), as in this example code:

```
<com.google.android.material.floatingactionbutton.FloatingActionButton
    android:id="@+id/fab"
    android:layout_width="wrap_content"
    android:layout_height="wrap_content"
    android:layout_gravity="end|bottom"
    android:src="@drawable/ic_my_icon"
    android:contentDescription="@string/submit"
    android:layout_margin="16dp" />
```

The FAB is colored by the colorAccent attribute, which can be customized with the theme's color palette. Other FAB properties can be configured using either XML attributes or corresponding methods, such as the following: (1) The size of the FAB, using the app: fabSize attribute or the setSize ( ) method; (2) The ripple color of the FAB, using the app: rippleColor attribute or the setRippleColor( ) method; (3) The FAB icon, using the android: src attribute or the setImageDrawable( ) method. Further, a View.OnClickListener can be applied to handle FAB taps.

Alternatively, the text processing extensions 110A, 110B can be programmed to call functions of the ONE UI 3.0 (or later) features of ANDROID 11 to create a floating notification in the form of a graphical icon of a specified size, shape, content, and color. Or, in certain other OS versions, the icon can be created using a system overlay (always on top) window by setting TYPE_SYSTEM_ALERT in the layout parameters.

In an embodiment, the text processing extensions 110A, 110B are programmed to detect that any application running on the computing device 102, and then currently the subject of use or focus by the user, has a text entry widget, box, or field, and to generate and cause visually rendering the modification icon 320 as an overlay, animated, or floating element over, in, on, or near the text entry widget, box or field of that application. In this manner, the text processing extensions 110A, 110B are programmed to make the modification icon 320 available for use in connection with any application that is running on the computing device 102. The modification icon 320 and its functions are available anywhere in the visual environment with which the user interacts with the computing device 102. When the modification icon 320 is associated with invoking the checks 144A, 144B, 144C of text processor 140, the text processing extensions 110A, 110B in effect make the functions of those checks available in any application that is running on the computing device 102, in association with any text entry widget, box or field with which the functions can be used. Examples of functions and checks include grammar checking, spelling checking, tone suggestions, audience suggestions, and others.

As an example and not by way of limitation, one or more modifications to input text 310 may be displayed by modification icon 320. In this example, modification icon 320 displays a transparent text box overlaying application 106, where the modification includes a strikethrough of "checks out" and a phrase suggestion of "checks out" displayed underneath the stricken text.

In particular embodiments, a user may select the modification icon 320 to apply the suggested modifications to input text 130. As an example and not by way of limitation, one embodiment may be programmed to use global event hooks to monitor touchscreen or other types of user input and perform custom hit-testing and dispatch of events with one of the text processing modules 110A, 110B. In response to input specifying applying a suggestion, text processing extensions 110A, 110B can be programmed to use accessibility API calls or services to modify the text to which the suggestions are applied. Applying suggestions can involve moving index values or pointers to represent a cursor location or the position of the next extension. Further, applying a suggestion can include programmatically sending a feedback signal to the phrase check 144C to enable back-end elements of text processor 140 to record the fact that a suggestion was accepted and applied.

Text processing module 110A, 110B may receive a signal from a user of the mobile computing device that hosts or executes the text processing module 110A, 110B to "Accept" or "Decline" the modification suggestion as presented within modification icon 320. In this way, a user may "Accept" the modification suggestion by selecting modification icon 320, thereby updating input text 310 with the suggested modification, bypassing the use of keyboard 330 altogether.

In particular embodiments, a user may dismiss the suggestions presented within modification icon 320 through a variety of movements. In one example, a user may dismiss modification icon 320 through a downward swipe.

In particular embodiments, text processor 140 may be programmed to determine whether an "Accept" signal or equivalent was received as input. If text processor 140 determines an "Accept" signal has been received as input, text processor 140 may be programmed to update, using the text processing module 110A, 110B, the input text 310 (for example, source text 130) using the accepted modification suggestion. Updating may comprise, for example, the text processing module 110A, 110B programmatically invoking an API call, internal method, or other programmed function, of the browser or app that the text processing module 110A, 110B extends, to insert the modification suggestion into the input text 310, or to delete the original sentence and insert the modification suggestion.

In particular embodiments, text processor 140 may be programmed to determine whether a "Decline" signal or equivalent was received as input. For example, the absence of an "Accept" signal may be registered as a "Decline" signal. As an example and not by way of limitation, one or more trained machine-learning models may be programmed to update training data used to train the multi-class text classifier 146, based on the signal. In this way, training data may be continuously updated based on user signals to indicate whether a particular modification suggestion was correct, or useful, or not.

The approaches disclosed herein provide efficient technical means for automatically updating a text that has been written using computer support. Further, modification icon 320 may be presented within a transparent window of the GUI. In this case, the transparent modification icon 320 may allow the interface to follow a user around from application to application while appearing at a particular position on the display. In the example of FIG. 3A, the modification icon 320 is displayed on the left side of the display, overlaying application 106.

FIG. 3B illustrates an example graphical user interface 340 that may be programmed to display a modified text sequence in conjunction with an application (for example, application 106). In FIG. 3B, GUI 340 provides a note composing function that includes an editable text field. In the example of FIG. 3B, the GUI window displays a portion of a note that is undergoing composition. In this example, input text 310 states "I likes you. I eats oranges."

In response to receiving input text 310 within the editable text field of application 106, text processing module 110A, 110B is programmed to transmit input text 310 to text processor 140 via network 120. In particular embodiments, text processor 140 may execute one or more trained machine-learning models on input text 130 to output one or more modifications. The output modification may include a grammar correction, phrase suggestion, or any other suitable modification. As an example and not by way of limitation, the output modification suggestion instructions 148 each correspond to the same sentiment, category, or class as each source text unit of input text 310, based on classification and mapping steps as previously described.

As an example and not by way of limitation, one or more modifications to input text 310 may be displayed by modification icon 320 and/or in proximity to input text 310. In the example of FIG. 3B, two modifications are suggested in association with input text 310. As an example and not by way of limitation, the GUI may display one or more underlined portions of input text 310 corresponding to the respective suggestion for a modification. For example, underlined portions 324 and 326 underline the words "likes" and "eats," each of which corresponds to a modification suggestion.

As demonstrated in FIG. 3B, modification icon 320 displays a transparent text box overlaying application 106, where the modification includes a strikethrough of "likes" and a phrase suggestion of "like" displayed underneath the stricken text.

In particular embodiments, upon selection, expand icon 322 may instruct GUI 340 to generate a larger display of the suggested modifications, where the expanded display may present additional information about each individual modification suggestion.

Figure 4A:
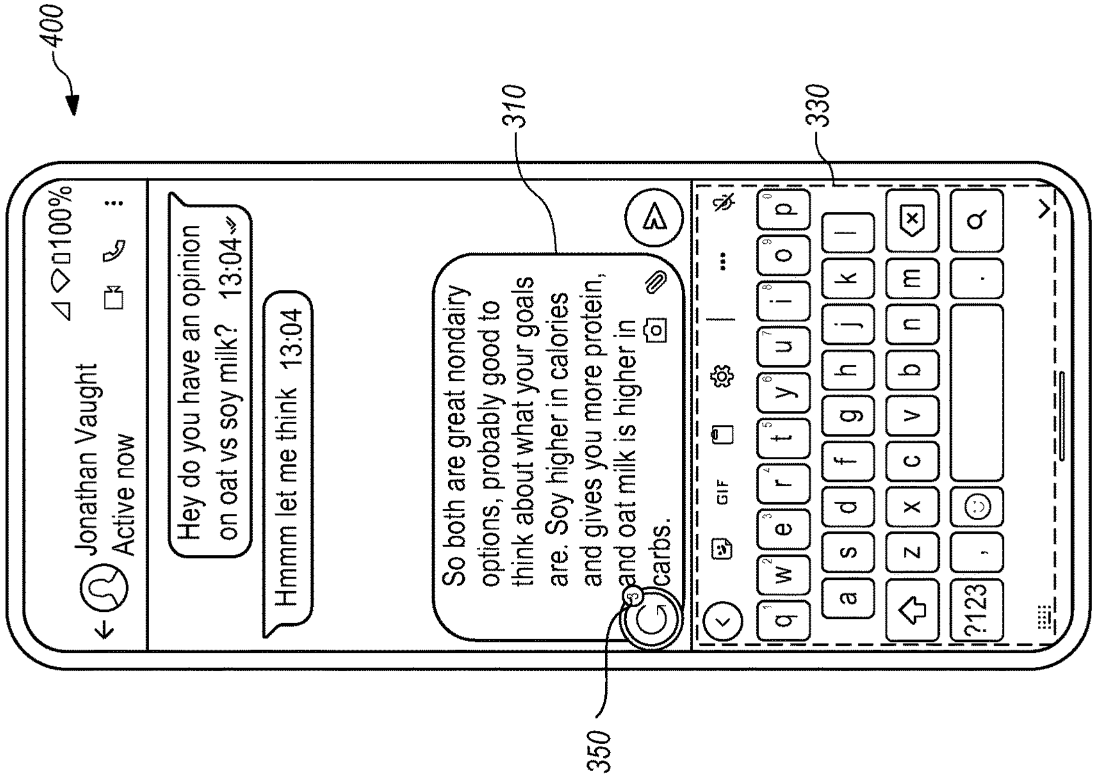
FIG. 4A illustrates an example graphical user interface for displaying multiple modifications to a text sequence.

FIG. 4A illustrates an example graphical user interface 400 for displaying multiple modifications to a text sequence. In the example of FIG. 4A, GUI 400 provides a text composing function that includes an editable text field. As an example and not by way of limitation, a user may compose input text 310 within an electronic messaging application (for example, application 106) via keyboard 330 of a mobile device.

As shown in GUI 400, icon 350 can include a counter, and in the example, it displays a numeric identifier of the number "3," indicating that text processor 140 has suggested modifications and transmitted suggestion set 132 comprising three suggested modifications to the mobile device. In particular embodiments, a text processor may be programmed to determine whether an "Accept" or "Decline" signal has been received as input. Upon registering an "Accept" signal, such as the user selection of icon 350, icon 350 may expand over keyboard 330 to display each of the individual modification suggestions, as discussed further in FIG. 4B.

In particular embodiments, a downward swipe, or swipe that would otherwise remove icon 350 from GUI 400 may be registered as a "Decline" signal. As an example and not by way of limitation, one or more trained machine-learning models may be programmed to update training data used to train the multi-text classifier 146 based on user signals (for example, "Accept" and "Decline"). In this way, training data may be continuously updated based on user signals.

Figure 4B:
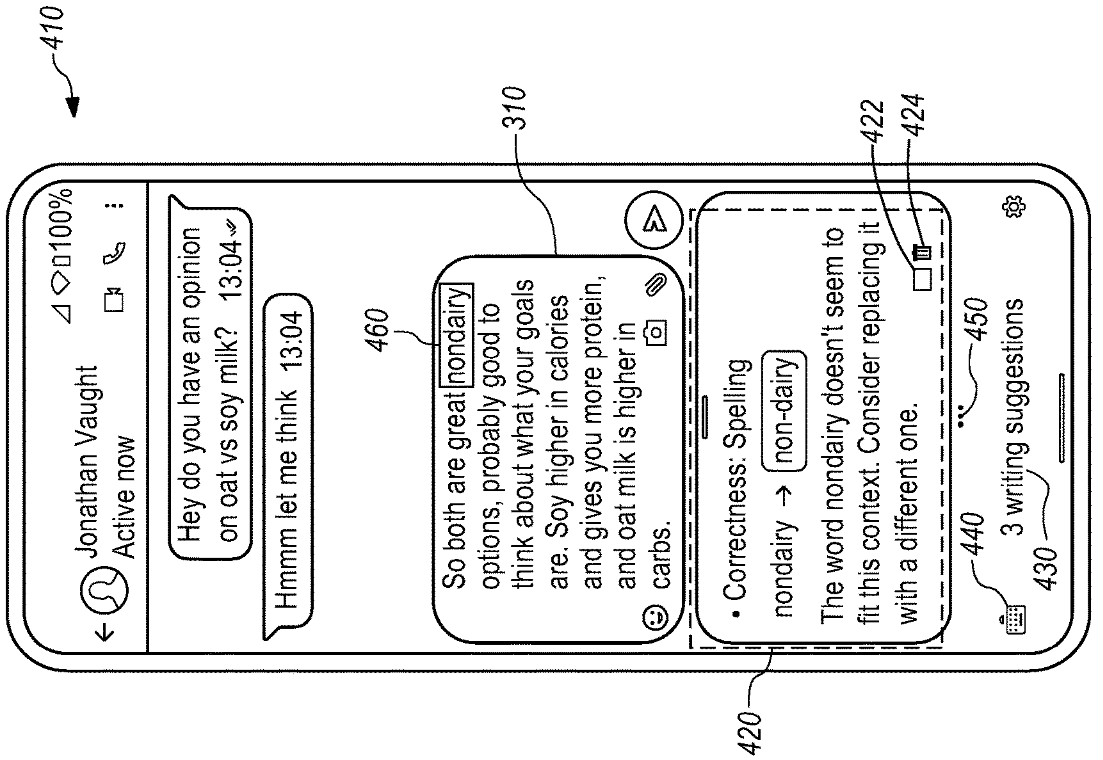
FIG. 4B illustrates an example graphical user interface for displaying multiple modifications to a text sequence.

FIG. 4B illustrates an example graphical user interface 410 for displaying multiple modifications to a text sequence. In FIG. 4B, GUI window 410 provides a text composing function that includes an editable text field. As an example and not by way of limitation, a user may compose input text 310 within an electronic messaging application (for example, application 106) via keyboard 330 of a mobile device. In the example of FIG. 4B, icon 350 of FIG. 4A has been selected, resulting in the generation of modification card 420, which may overlay or replace keyboard 330 of the mobile device. As an example and not by way of limitation, as displayed by GUI 410, modification card 420 may display a first modification suggestion of a series of modification suggestions. In this case, the first modification suggestion of input text 310 is displayed via highlighted portion 460, which corresponds to a section of input text 310 to be modified. In this example, highlighted portion 46 highlights the word "nondairy", and modification card 420 prompts a user to correct "nondairy" to "non-dairy."

As an example and not by way of limitation, modification card 420 may display an explanation of the modification corresponding to highlighted portion 460. In this example, modification card 420 may indicate a category of the modification. As an example and not by way of limitation, modification categories may include spelling, grammar, tone, and/or any other suitable category of modifications.

Modification card 420 may also display an explanation of the suggested modification. For example, in GUI 410, modification card 420 may read "The word nondairy doesn't seem to fit this context. Consider replacing it with a different one."

In particular embodiments, a user may switch scroll between a plurality of modification suggestions, wherein a total number of modification suggestions may be displayed by counting functionality 430. As an example and not by way of limitation, a user may swipe between the plurality of modification cards 420, wherein swipe indication 450 may display an indication of the particular modification card 420 being displayed in view of a total number of modification suggestions.

In one embodiment, a user can apply a suggestion by selecting the suggestion. For example, a single tap on a suggestion can be programmed as a selection action, and, in response, the suggestion can be applied. In particular embodiments, a user may decline a particular modification by selecting keyboard call icon 440. Upon selection of keyboard call icon 440, keyboard 330 may be redisplayed, replacing modification card 440. As an example and not by way of limitation, text processor 140 may be programmed to determine that the selection of keyboard call icon 440 is to be processed as a "Decline" signal. In this case, modification card 420 may be dismissed, and the one or more trained machine-learning models may be programmed to update training data used to train the multi-text classifier 146 based on the received "Decline" signal. Although this disclosure discusses the aforementioned icons, this disclosure contemplates any suitable icon and corresponding functionality. For example, the GUI may include an icon that acts as a shortcut to open or return to a second application.

In one embodiment, a suggestion 420 is programmed to display an Add to Dictionary button 422 and a delete icon 424. In some embodiments, visual icons representing a book or trash can be used, but the specific form of the icons is not critical. In an embodiment, selecting the Add to Dictionary button 422 dismisses suggestion 420 and adds a word identified in the suggestion to a user-specific dictionary of words; this option is appropriate for suggestions relating to spelling that show correct words, acronyms, or jargon. The delete icon 424 can be programmed to dismiss the suggestion and to generate and programmatically transmit a feedback signal to the text processor 140 specifying that the suggestion was dismissed. Such negative feedback can contribute to improved machine learning model processing on the server side by supplementing a training dataset for use in retraining the model.

2.3 Application Programming Interface Permissions

Figure 5:
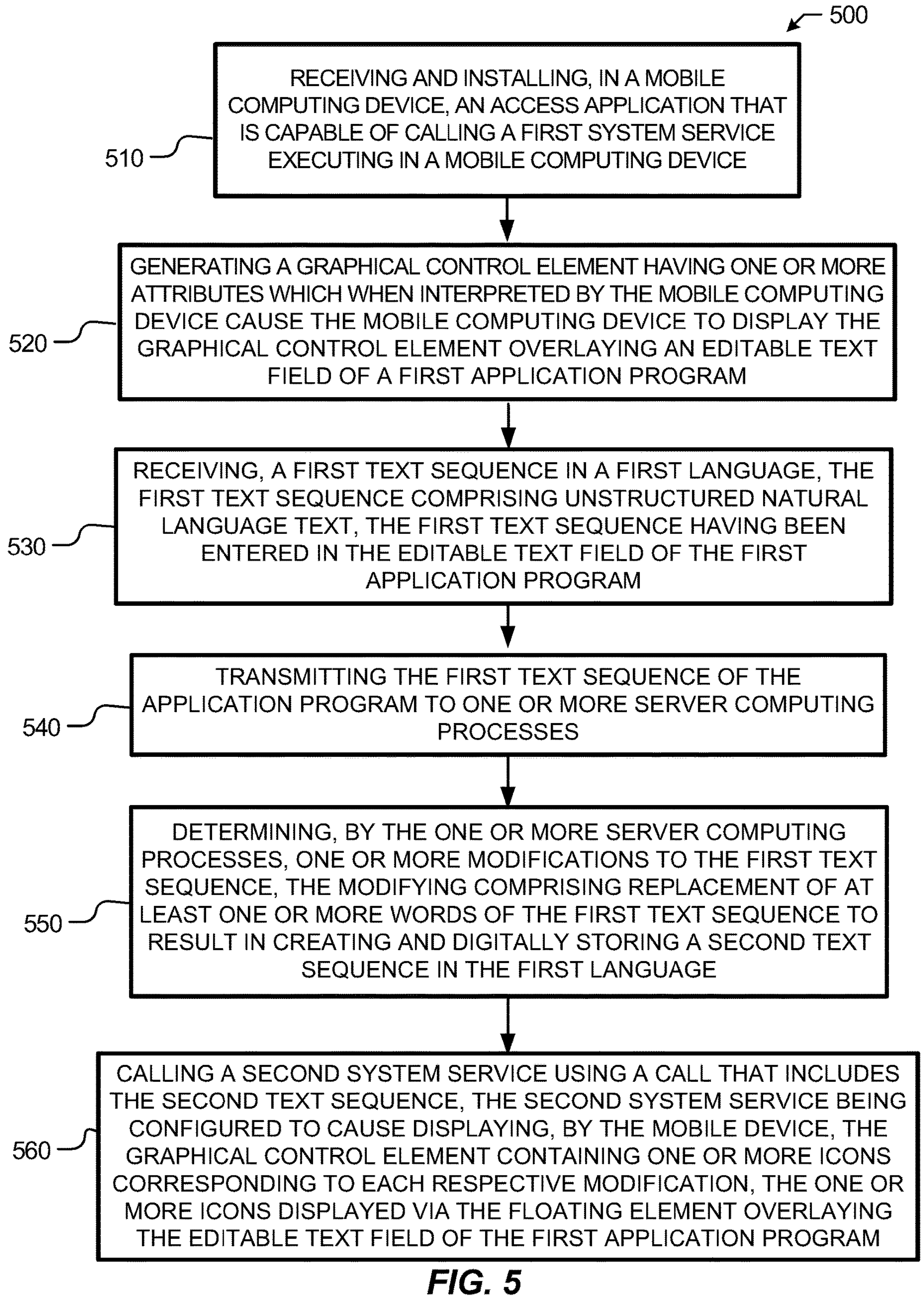
FIG. 5 illustrates an example computer-implemented or programmed process for determining modifications to a first sequence and displaying the modifications via a graphical user interface.

FIG. 5 illustrates an example of a computer-implemented or programmed process 500 for determining modifications to a first sequence and displaying the modifications via a graphical user interface. In one embodiment, process 500 is programmed to begin execution at step 510 by receiving and installing, in a mobile computing device, an access application that is capable of calling a first system service executing in a mobile computing device (for example, computing device 102). The access application may be programmed to call one or more accessibility functions of an operating system of the mobile computing device. As an example and not by way of limitation, the access application may be programmed to call one or more functions of a first application programming interface ("API") that is associated with the first system service. The API associated with the first system service may be an accessibility API, as described with more specificity herein, or another API provided by operating system 104 (for example, ANDROID). In one embodiment, in response to a detected event, such as a scroll or switching between applications, the process may implement text processing module 110A, 110B to infer that the text being displayed on display device 112 has changed-necessitating a change or repositioning in, for example, ML model output such as underlining or other markup. It is understood that the first system service may be equivalent to a first system function, first system method, or any other suitable terminology.

In one embodiment, process 500 may be programmed to execute step 520 by generating a graphical control element having one or more attributes which when interpreted by the mobile computing device may cause the mobile computing device to display the graphical control element overlaying an editable text field of the first application program. As an example and not by way of limitation, the graphical control element may be displayed via a floating element overlaying an editable text field of the first application program. As another example and not by way of limitation, the graphical control element may be visually rendered as an overlay, floating element over, in, on, or near the editable text field of the application program. For example, the mobile device may generate modification icon 320, wherein the text processing extensions 110A, 110B are programmed to make the modification icon 320 available for use in connection with any application that is running on the computing device 102.

In one embodiment, process 500 may be programmed to execute step 530 by receiving a first text sequence in a first language, the first text sequence comprising unstructured natural language text, the first text sequence having been entered in the editable text file of the first application program (for example, application 106, 108).

In one embodiment, process 500 may be programmed to execute step 540 by transmitting the first text sequence of the application program to one or more server computing processes. As an example and not by way of limitation, the transmitting of step 540 may occur via one or more data communication networks. It is understood that the one or more server computing processes may be separate from or external to the mobile computing device. In one embodiment, the server computing process may occur on the mobile device (for example, computing device 102). In this example, the one or more trained machine-learning models may execute on the mobile device via various optimizations.

In particular embodiments, determining the modifications of step 550 may include receiving, at a trained machine-learning model, the first text sequence in the first language, executing the trained machine-learning model on the first text sequence, thereby outputting modifications specifying one or more types of markup and one or more character ranges associated with that type of markup, and programmatically transforming the output into the second text sequence, the second text sequence including the modifications specifying the one or more types of markup and associated character range associated with that type of markup.

In one embodiment, process 500 may be programmed to execute step 550 by determining, by the one or more server computing processes, one or more modifications to the first text sequence. As an example and not by way of limitation, process 500 may determine modifications to the first text sequence by receiving, at one or more trained machine-learning models, the first text sequence in the first language. The one or more trained machine-learning models may process the first text sequence, thereby outputting modifications specifying one or more types of markup and the one or more character ranges associated with that type of markup. Process 500 may then programmatically transform the output into a second text sequence, where the second text sequence includes modifications specifying the one or more types of markup and the associated character range associated with that type of markup.

As an example and not by way of limitation, the modifications to the first text sequence may include replacing at least one or more words of the first text sequence, resulting in creating and digitally storing a second text sequence in the first language.

In one embodiment, process 500 may be programmed to execute step 560, where a second system service may be called using a call that includes the second text sequence, as created in step 550. As an example and not by way of limitation, the second system service may be configured to cause displaying, by the mobile device (for example, computing device 102), a graphical control element containing one or more icons, wherein the icons correspond to each respective modification. As an example and not by way of limitation, the one or more icons displayed via the floating element may overlay the editable text field of the first application program.

It is understood that an operating system 104 of the mobile computing device may comprise both the first system service and the second system service. In particular embodiments, the first system service may be responsive to the first API, and the second system service may be responsive to a second API.

In particular embodiments, the mobile device may request one or more permissions from the API. As an example and not by way of limitation, the permission request may include a request to view a state or current condition of objects within a particular application (for example, if a checkbox is selected, partially selected, or not selected). As another example and not by way of limitation, the permission request may include a request to view a visible label (such as text on a button), or the role of the button. As a further example, the permission request from the first API may include a request to display a graphical control element in a configuration overlaying the first application program. In response to receiving permissions from the first API, text processor 140 may determine a location within the display of the mobile device for displaying the graphical control element in the configuration overlaying the first application program and specifying the location in calling the second system service.

In particular embodiments, the second text sequence may be displayed in a transparent window in the graphical control element.

In one embodiment, process 500 may be programmed to reduce the number of API calls necessary to implement process 500, saving processing resources, time, network bandwidth, and other resources of computing device 102 and other system components, thereby improving the functioning of computing device 102 (for example, a mobile device).

Step 560 may include executing programmed instructions formatted to cause generating a transparent window overlaying a currently focused element, or application program. In one embodiment, generating a transparent window to render markup such as underlining, strikethrough, and/or other modifications represents a technical solution to enhance the interoperability of machine-learning output display processes in diverse technical settings (for example, ANDROID).

In one embodiment, the graphical control element including the transparent window may be programmed to be click-through, such that a user may position the transparent window at particular locations to allow for interacting with visual elements within the window. As an example and not by way of limitation, the second text sequence may be displayed in the transparent window of the graphical control element.

In particular embodiments, the graphical control element indicative of the second text sequence may include a numeric identifier indicating the total number of modifications corresponding to the first text sequence.

In particular embodiments, the graphical control element indicative of the second text sequence may display, in the transparent window, one or more types of markup. Displaying markup comprise, for example, rendering, in the transparent window, underlining, highlighting, a heatmap, shadow, background color, strikethrough, annotation, overlayed suggestions or other text, or another form of markup or visual augmentation of the text.

As an example and not by way of limitation, the one or more types of markup may correspond to one or more character ranges associated with that type of markup within the second text sequence. As an example and not by way of limitation, each of these characters may be programmatically assigned a corresponding number by, for example, text processing module 110A, 110B, or by another system component. Thus, in one embodiment, a character range may represent a numbered sequence or string of characters digitally representing natural language. Each of the checks 144A, 144B, 144C may be programmed to execute a different form of checking or processing of a text change, including grammar checking, spell checking, tone detection, or phrase checking. In one embodiment, the processing of one or more of these checks by text processor 140 may result in the generation of one or more forms of markup, which may be associated with one or more character ranges. For example, a tone check could identify a first character range (12-38) as representing a clause with an inappropriate tone, while a phrase check identifies a second character range (89-111) as representing language wherein a phrase suggestion would be appropriate. In one embodiment, one of the text processing modules 110A, 110B may be programmed to associate each check with a type of markup, which may be the same type or a different type. Thus, in the given example, each of the first and second character ranges may be programmatically associated with underlining.

In particular embodiments, the mobile device may receive input by a user, indicating a downward swipe on the graphical control element. In response to receiving this input, process 500 may execute instructions to dismiss the graphical control element indicative of the second text sequence.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
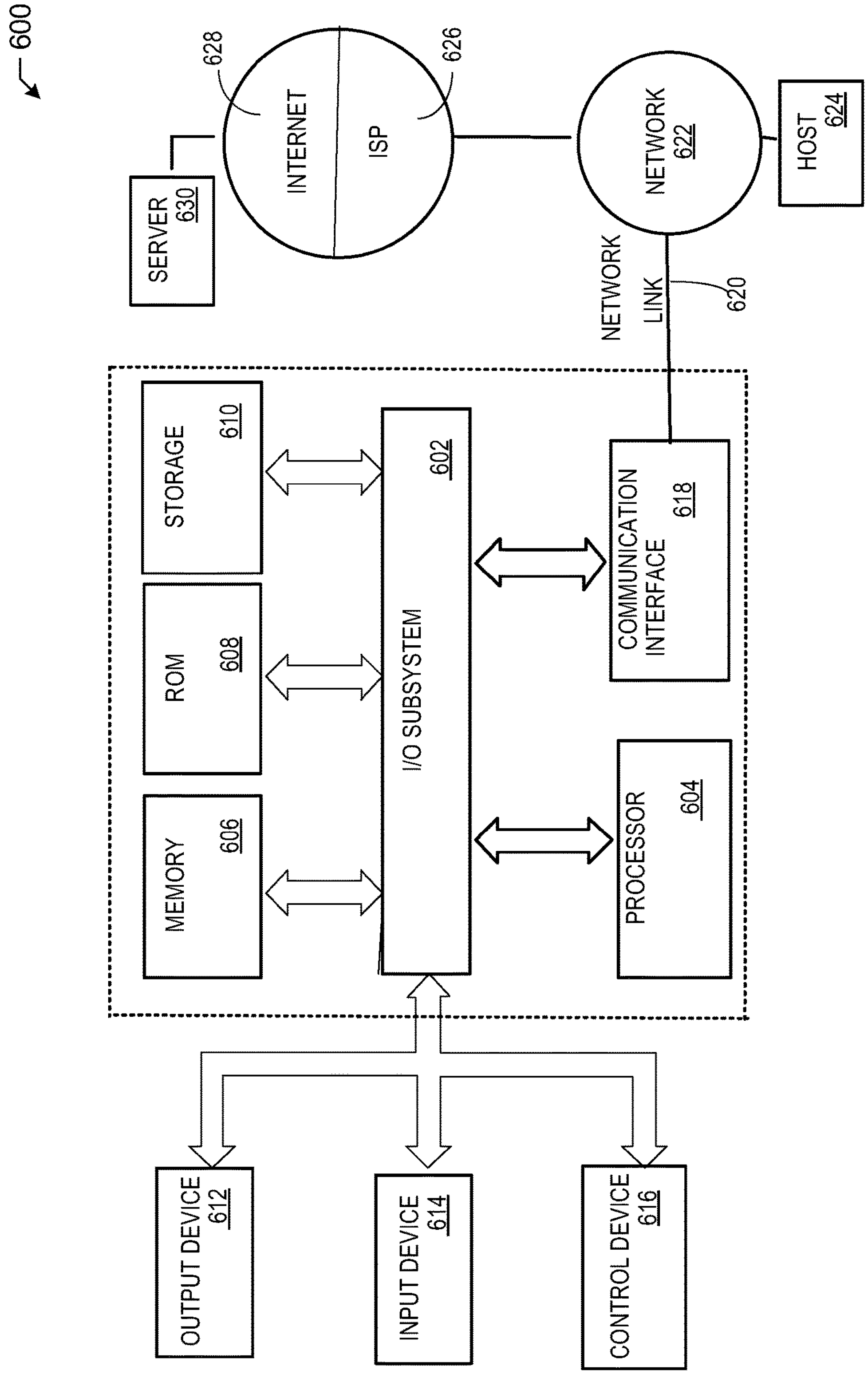
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanisms for communicating information and/or instructions between the components of the computer system 600 over electronic signal paths. The I/O subsystem 602 may include an I/O controller, a memory controller, and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system, a graphics processing unit (GPU), or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or another dynamic storage device. Memory 606 also may be used for storing temporary variables or other intermediate information during the execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read-only memory (ROM) 608 or other static storage devices coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, solid-state storage, magnetic disk or optical disks such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as extensions, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 600 may be coupled via I/O subsystem 602 to at least one output device 612. In one embodiment, output device 612 is a digital computer display. Examples of a display that may be used in various embodiments include a touchscreen display, a light-emitting diode (LED) display, a liquid crystal display (LCD), or an e-paper display. Computer system 600 may include another type(s) of output device 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or another type of control device. An input device 614 may include a combination of multiple different input devices, such as a video camera and a depth sensor.

In another embodiment, computer system 600 may comprise an Internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders, and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS extension that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 602. Transmission media can also take the form of acoustic or light waves, such as those generated during radio-wave and infrared data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 and place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to a network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a worldwide packet data communication network represented as internet 628. A server computer 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, a server farm, or other organization of computers that cooperate to perform tasks or execute applications or services. Server 630 may comprise one or more sets of instructions that are organized as extensions, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer, and data storage layer such as a relational database system using a structured query language (SQL) or no SQL, an object store, a graph database, a flat-file system, or other data storage.

Computer system 600 can send messages and receive data and instructions, including program code, through the network(s), network link 620, and communication interface 618. In the Internet example, a server 630 might transmit a requested code for an application program through Internet 628, ISP 626, local network 622, and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:

receiving and installing, in a mobile computing device, an access application that is capable of calling a first system service executing in the mobile computing device, the first system service being a system service of an operating system of the mobile computing device and responsive to a first application programming interface (API) of the operating system;

generating a graphical control element having one or more attributes which when interpreted by the mobile computing device cause the mobile computing device to display the graphical control element overlaying an editable text field of a first application program;

receiving a first text sequence in a first language, the first text sequence comprising unstructured natural language text, the first text sequence having been entered in the editable text field of the first application program;

transmitting the first text sequence of the first application program to one or more server computing processes;

determining, by the one or more server computing processes, one or more modifications to the first text sequence, the one or more modifications comprising replacement of at least one or more words of the first text sequence to result in creating and digitally storing a second text sequence in the first language; and calling, by the access application, a second system service using a call that includes the second text sequence, the second system service being a system service of the operating system of the mobile computing device and responsive to a second API of the operating system that is different from the first API, and configured to cause displaying, by the mobile computing device, the graphical control element containing one or more icons corresponding to each respective modification of the one or more modifications, the graphical control element containing the one or more icons displayed via a floating element overlaying the editable text field of the first application program.

2. The computer-implemented method of claim 1, the floating element displaying one or more of a grammar check, spelling check, tone suggestion, or audience suggestion.

3. The computer-implemented method of claim 1, the access application being programmed to call one or more accessibility functions of the operating system of the mobile computing device.

4. The computer-implemented method of claim 3, wherein the operating system is an operating system in which system services, primitives, and utilities of the operating system are available to other applications as installed applications.

5. The computer-implemented method of claim 1, the access application being programmed to call one or more functions of the first API, wherein the first API is an Accessibility API.

6. The computer-implemented method of claim 1, further comprising:

requesting one or more permissions from the access application, the one or more permissions including a request to display the graphical control element in a configuration overlaying the first application program; and in response to receiving the one or more permissions from the access application, determining a location within a display of the mobile computing device for displaying the graphical control element and specifying the location in calling the second system service.

7. The computer-implemented method of claim 1, the second text sequence being displayed in a transparent window in the graphical control element.

8. The computer-implemented method of claim 1, the graphical control element including one or more underlined portions of the first text sequence, the one or more underlined portions indicating a suggested modification.

9. The computer-implemented method of claim 1, the graphical control element displaying, in a transparent window, one or more types of markup corresponding to one or more character ranges within the second text sequence.

10. The computer-implemented method of claim 1, further comprising:

receiving, by the mobile computing device, input by a user, the input indicating a downward swipe on the graphical control element; and executing instructions to dismiss the graphical control element in response to receiving the input indicating the downward swipe on the graphical control element.

11. The computer-implemented method of claim 1, wherein the determining of the one or more modifications to the first text sequence further comprises:

receiving, at a trained machine-learning model, the first text sequence in the first language;

executing the trained machine-learning model on the first text sequence, thereby outputting the one or more modifications specifying one or more types of markup and one or more character ranges associated with each of the one or more types of markup; and programmatically transforming the one or more modifications specifying one or more types of markup and one or more character ranges associated with each of the one or more types of markup into the second text sequence, the second text sequence including the one or more modifications specifying the one or more types of markup and associated character range associated with each of the one or more types of markup.

12. One or more non-transitory computer-readable media storing one or more programs for execution by one or more processors, the one or more programs comprising instructions configured for:

receiving and installing, in a mobile computing device, an access application that is capable of calling a first system service executing in the mobile computing device, the first system service being a system service of an operating system of the mobile computing device and responsive to a first application programming interface (API) of the operating system;

generating a graphical control element having one or more attributes which when interpreted by the mobile computing device cause the mobile computing device to display the graphical control element overlaying an editable text field of a first application program;

receiving a first text sequence in a first language, the first text sequence comprising unstructured natural language text, the first text sequence having been entered in the editable text field of the first application program;

transmitting the first text sequence of the first application program to one or more server computing processes;

determining, by the one or more server computing processes, one or more modifications to the first text sequence, the one or more modifications comprising replacement of at least one or more words of the first text sequence to result in creating and digitally storing a second text sequence in the first language; and calling, by the access application, a second system service using a call that includes the second text sequence, the second system service being a system service of the operating system of the mobile computing device responsive to a second API of the operating system that is different from the first API, and configured to cause displaying, by the mobile computing device, the graphical control element containing one or more icons corresponding to each respective modification of the one or more modifications, the graphical control element containing the one or more icons displayed via a floating element overlaying the editable text field of the first application program.

13. The one or more non-transitory computer-readable media of claim 12, the floating element displaying one or more of a grammar check, spelling check, tone suggestion, or audience suggestion.

14. The one or more non-transitory computer-readable media of claim 12, the access application being programmed to call one or more accessibility functions of the operating system of the mobile computing device.

15. The one or more non-transitory computer-readable media of claim 14, wherein the operating system is an operating system in which system services, primitives, and utilities of the operating system are available to other applications as installed applications.

16. The one or more non-transitory computer-readable media of claim 12, the access application being programmed to call one or more functions of the first API, wherein the first API is an Accessibility API.

17. The one or more non-transitory computer-readable media of claim 12, the one or more programs further comprising instructions configured for:

requesting one or more permissions from the access application, the one or more permissions including a request to display the graphical control element in a configuration overlaying the first application program; and in response to receiving the one or more permissions from the access application, determining a location within a display of the mobile computing device for displaying the graphical control element and specifying the location in calling the second system service.

18. The one or more non-transitory computer-readable media of claim 12, the second text sequence being displayed in a transparent window in the graphical control element.

19. The one or more non-transitory computer-readable media of claim 12, the graphical control element including one or more underlined portions of the first text sequence, the one or more underlined portions indicating a suggested modification.

20. The one or more non-transitory computer-readable media of claim 12, the graphical control element displaying, in a transparent window, one or more types of markup corresponding to one or more character ranges within the second text sequence.

21. The one or more non-transitory computer-readable media of claim 12, the one or more programs further comprising instructions configured for:

receiving, by the mobile computing device, input by a user, the input indicating a downward swipe on the graphical control element; and executing instructions to dismiss the graphical control element in response to receiving the input indicating the downward swipe on the graphical control element.

22. The one or more non-transitory computer-readable media of claim 12, wherein the determining of the one or more modifications to the first text sequence further comprises:

receiving, at a trained machine-learning model, the first text sequence in the first language;

executing the trained machine-learning model on the first text sequence, thereby outputting the one or more modifications specifying one or more types of markup and one or more character ranges associated with each of the one or more types of markup; and programmatically transforming the one or more modifications specifying one or more types of markup and one or more character ranges associated with each of the one or more types of markup into the second text sequence, the second text sequence including the one or more modifications specifying the one or more types of markup and associated character range associated with each of the one or more types of markup.

23. A mobile computing device comprising:

one or more processors; and one or more computer-readable non-transitory storage media coupled to one or more of the processors and storing instructions operable, when executed by one or more of the processors, to cause the mobile computing device to:

receive and install, in the mobile computing device, an access application that is capable of calling a first system service executing in the mobile computing device, the first system service being a system service of an operating system of the mobile computing device and responsive to a first application programming interface (API) of the operating system;

generate a graphical control element having one or more attributes which when interpreted by the mobile computing device cause the mobile computing device to display the graphical control element overlaying an editable text field of a first application program;

receive a first text sequence in a first language, the first text sequence comprising unstructured natural language text, the first text sequence having been entered in the editable text field of the first application program;

transmit the first text sequence of the first application program to one or more server computing processes;

receive, in the mobile computing device, one or more modifications to the first text sequence determined by the one or more server computing processes, the one or more modifications comprising replacement of at least one or more words of the first text sequence to result in creating and digitally storing a second text sequence in the first language; and call, by the access application, a second system service using a call that includes the second text sequence, the second system service being a system service of the operating system of the mobile computing device responsive to a second API of the operating system that is different from the first API, and configured to cause displaying, by the mobile computing device, the graphical control element containing one or more icons corresponding to each respective modification of the one or more modifications, the graphical control element containing the one or more icons displayed via a floating element overlaying the editable text field of the first application program.

24. The mobile computing device of claim 23, the floating element displaying one or more of a grammar check, spelling check, tone suggestion, or audience suggestion.

25. The mobile computing device of claim 23, the access application being programmed to call one or more accessibility functions of the operating system of the mobile computing device.

26. The mobile computing device of claim 25, wherein the operating system is an operating system in which system services, primitives, and utilities of the operating system are available to other applications as installed applications.

27. The mobile computing device of claim 23, the access application being programmed to call one or more functions of the first API, wherein the first API is an Accessibility API.

28. The mobile computing device of claim 23, the one or more computer-readable non-transitory storage media storing instructions operable, when executed by one or more of the processors, to cause the mobile computing device to:

request one or more permissions from the access application, the one or more permissions including a request to display the graphical control element in a configuration overlaying the first application program; and in response to receiving the one or more permissions from the access application, determine a location within a display of the mobile computing device for displaying the graphical control element and specifying the location in calling the second system service.

29. The mobile computing device of claim 23, the second text sequence being displayed in a transparent window in the graphical control element.

30. The mobile computing device of claim 23, the graphical control element including one or more underlined portions of the first text sequence, the one or more underlined portions indicating a suggested modification.

31. The mobile computing device of claim 23, the graphical control element displaying, in a transparent window, one or more types of markup corresponding to one or more character ranges within the second text sequence.

32. The mobile computing device of claim 23, the one or more computer-readable non-transitory storage media storing instructions operable, when executed by one or more of the processors, to cause the mobile computing device to:

receive, by the mobile computing device, input by a user, the input indicating a downward swipe on the graphical control element; and dismiss the graphical control element in response to receiving the input indicating the downward swipe on the graphical control element.

33. The mobile computing device of claim 23, wherein the one or more modifications to the first text sequence specify one or more types of markup and one or more character ranges associated with each of the one or more types of markup determined by executing a trained machine learning model on the first text sequence in the first language; and wherein the second text sequence in the first language is a programmatically transformed version of the one or more modifications to the first text sequence specifying the one or more types of markup and the one or more character ranges associated with each of the one or more types of markup.

* * * * *